(12) United States Patent
Specht et al.

(10) Patent No.: US 6,405,963 B1
(45) Date of Patent: Jun. 18, 2002

(54) CHILD SEAT LOCKING DEVICE FOR AN AUTOMATIC SEATBELT RETRACTOR

(75) Inventors: Martin Specht, Feldafing; Andrew Wallace, Schondorf, both of (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/567,940

(22) Filed: May 10, 2000

(30) Foreign Application Priority Data

Oct. 27, 1999 (DE) .......................................... 199 51 791

(51) Int. Cl.[7] .............................................. B60R 22/38
(52) U.S. Cl. ..................................... 242/382.2; 280/807
(58) Field of Search ....................... 242/382.2; 280/806, 280/807; 297/476, 478

(56) References Cited

U.S. PATENT DOCUMENTS 5,367,917 A 11/1994 Hishon et al. ................. 74/531
5,624,087 A 4/1997 Dick et al. ................ 242/381.1

FOREIGN PATENT DOCUMENTS

| EP | 0298123 | 1/1989 |
|---|---|---|
| EP | 0625449 B1 | 2/1994 |

*Primary Examiner*—John Q. Nguyen
(74) *Attorney, Agent, or Firm*—Lonnie Drayer

(57) ABSTRACT

An automatic seatbelt retractor has a winding shaft for winding and unwinding seatbelt webbing and at least one pre-locking device for pre-locking the winding shaft against further rotation and for driving into a main locking means. Forces exerted by the seatbelt webbing are introduced into a frame connected to a vehicle. The pre-locking device has an actuating device that actuates at least one securing component as a function of a predetermined extracted length of the seatbelt webbing from the winding shaft to hold the winding shaft in the pre-locking position. For actuation of the securing component by the actuating device a single intermediate element, which can be moved reversibly by the actuating device from a rest position into a locking position, is provided between the actuating device and the securing component.

23 Claims, 3 Drawing Sheets

CHILD SEAT LOCKING DEVICE FOR AN AUTOMATIC SEATBELT RETRACTOR

FIELD OF THE INVENTION

The present invention relates to an automatic seatbelt retractor for a seatbelt system in a motor vehicle.

BACKGROUND OF THE INVENTION

Automatic seatbelt retractors return a seatbelt automatically back to its' original position after use. An automatic seatbelt retractor should prevent catching in the otherwise slack seatbelt located inside a vehicle when getting in and out, or loading and unloading, etc. Of course, automatic seatbelt retractors contain those components of a seatbelt system that prevent a forward movement of a person secured by the seatbelt when the motor vehicle is subjected to rapid deceleration. A locking device that prevents unwinding of the seatbelt in such cases carries this out. To distinguish from further locking devices which may be provided, this module is described as the main locking means.

Further locking devices of this type can include a so-called vehicle-sensitive and/or webbing-sensitive locking or blocking device. Both blocking devices serve to prevent a forward movement of the person secured by the seatbelt system even during decelerations of the motor vehicle which are lower than the decelerations releasing the main locking means. As these blocking devices come into action before activation of the main locking means, they are frequently also described as pre-locking or pre-blocking devices. The respective pre-blocking device is able to lock the seatbelt system to prevent further unwinding of the seatbelt webbing also via the main locking means.

As the seatbelt frequently secures not only a person but also child seats or other bulky objects transported inside the vehicle, a further pre-locking device is frequently provided in the known automatic seatbelt retractors, in order to lock the automatic seatbelt retractor against further extraction after extraction of a predetermined length of seatbelt webbing from the winding shaft. Although the seatbelt can be retracted again until the child seat and/or the bulky object is firmly secured by the seatbelt, the seatbelt cannot be further extracted. This prevents the object secured in this way from moving during deceleration of the motor vehicle. This pre-locking device is frequently referred to as a child seat locking device.

DISCUSSION OF THE PRIOR ART

European Patent 0 625 449 discloses an automatic seatbelt retractor of the type mentioned at the outset with a child seat locking device in which a rotatably mounted securing lever is provided. The securing lever acts at both ends and can be pivoted from a rest position into a locking position according to the predetermined extracted length of the seatbelt by means of an actuating device. The securing lever is biased into the rest position by means of a spring, exceeds its' dead center position during actuation thereof by the actuating device and is then biased into the locking position again by the spring. The securing lever engages teeth of a wheel non-rotatably connected to the winding shaft, the teeth on the exterior of this wheel being in the form of saw teeth. The saw teeth point in the unwinding direction. The securing lever can therefore pass over the wheel in the take-in direction of the seatbelt webbing as the locking position is released and can finally pivot back into its' rest position.

This well functioning child seat locking device contains, in addition to the actuating device, two separate components that are small in construction owing to the restricted space in automatic winding devices of this type. This makes assembly, in particular of the springs, difficult and time-consuming. This is a drawback, in particular if assembly is to be carried out using automatic assembly devices.

SUMMARY OF THE INVENTION

There is provided in accordance with the present invention an automatic seatbelt retractor of the type mentioned at the outset in which the child seat locking device has fewer components compared to those of the prior art.

Since only a single intermediate element is required for actuation of the securing components by the actuating device, with the solution according to the invention. Not only are the pure material and production costs reduced as the number of components is diminished, but also the assembly costs are reduced, since only a single component has to be assembled in addition to the components already used in the past.

In this connection, it should be pointed out that the intermediate element is able to act on an independent securing component for the child seat locking device. It is also possible for the intermediate element to act on an existing securing component of one of the above-mentioned pre-locking devices, in particular the vehicle-sensitive pre-locking or pre-blocking device. The securing component can be a pre-blocking pawl that engages in the teeth of a gear wheel that is non-rotatably connected to the winding shaft.

For a compact construction of the automatic seatbelt retractor according to the invention, the vehicle-sensitive pre-blocking device can comprise a carrier disc on which the intermediate element and optionally the securing component are rotatably or pivotally mounted.

In order to maintain this position, it is in principle sufficient for either the actuating device or the intermediate element to be releasably lockable in the locking position of the pre-locking device or of the child seat locking device, in order to maintain this position. To achieve greater security, however, the actuating device and the intermediate element can also be releasably lockable, independently of one another, in the locking position of the pre-locking device. Catch pins for fixing the actuating device and the intermediate element can be provided on the carrier disc for this purpose.

In order to maintain actuation of the intermediate element as simple as possible, it has proven advantageous if the intermediate element comprises at least one cam portion which is in engagement with the actuating device, and one actuating portion which actuates the securing component triggering the pre-locking of the winding shaft.

To prevent the pre-locking position from being released prematurely, it is preferably also proposed that the intermediate element have a locking portion for the releasable locking of the intermediate element in its' locking position.

In principle, it would be conceivable for the actuating device to be actuated merely by a movement derived from the winding shaft. It is advantageous, however, if the actuating device is a reduction gear that is in direct rotational connection with the winding shaft.

Furthermore, the actuating device can again have any construction. It is advantageous if the actuating device contains a tumbling disc which is arranged eccentrically on the winding shaft, is rotatably connected thereto and, as a function of the extracted length of the seatbelt webbing, actuates an activation disc which is rotatably mounted on the winding shaft and is in engagement with the intermediate element. The tumbling disc can have external teeth that roll on internal teeth that are stationary relative to the rotating tumbling disc.

For actuating the cam portion of the intermediate element, the activating disc can be provided, on its' outer circumference, with a corresponding control contour that scans the cam portion.

To enable the activating disc to actuate the intermediate element when the predetermined length of seatbelt webbing is extracted, the activating disc can have an arcuate recess in which engages a driving pin non-rotatably connected to the tumbling disc. Starting with completely retracted seatbelt webbing, initially the winding shaft, and therefore also the tumbling disc, are set into rotation as the seatbelt webbing is extracted. When a first predetermined extracted length is reached, the driving pin of the tumbling disc comes into contact with one edge of the arcuate recess of the activating disc and entrains the activating disc. The cam portion of the intermediate element therefore slides on the control contour of the outer circumference of the activating disc and, after reaching the second predetermined extracted length, actuates the securing component of the pre-locking device.

To avoid premature release of the pre-locking device, the activating disc can also be lockable in the pre-locking position. This catching of the activating disc in the pre-locking position can be achieved by means of a catch lever which is provided at the outer circumference of the activating disc and rests releasably on a catch pin which is stationary in the pre-locking position of the catch lever. This catch pin can in turn be provided on the vehicle-sensitive pre-locking device. To enable the catch lever of the activating disc to be released from the catch pin on release of the pre-locking position, the catch pin can also have a contour that is such that the catch lever is not blocked on the catch pin.

To achieve secure locking, it is also advantageous if the securing component is formed by a pawl which is pivotally mounted and which can be pivoted by the intermediate element into the pre-locking position in which the pawl engages in the saw teeth of external teeth of a wheel non-rotatably connected to the winding shaft, the saw teeth pointing in the unwinding direction.

For reducing the weight of the automatic seatbelt retractor according to the invention and the production costs, it is of further advantage that the intermediate element is produced from a plastic material.

DETAILED DESCRIPTION OF THE INVENTION

Figure 1:
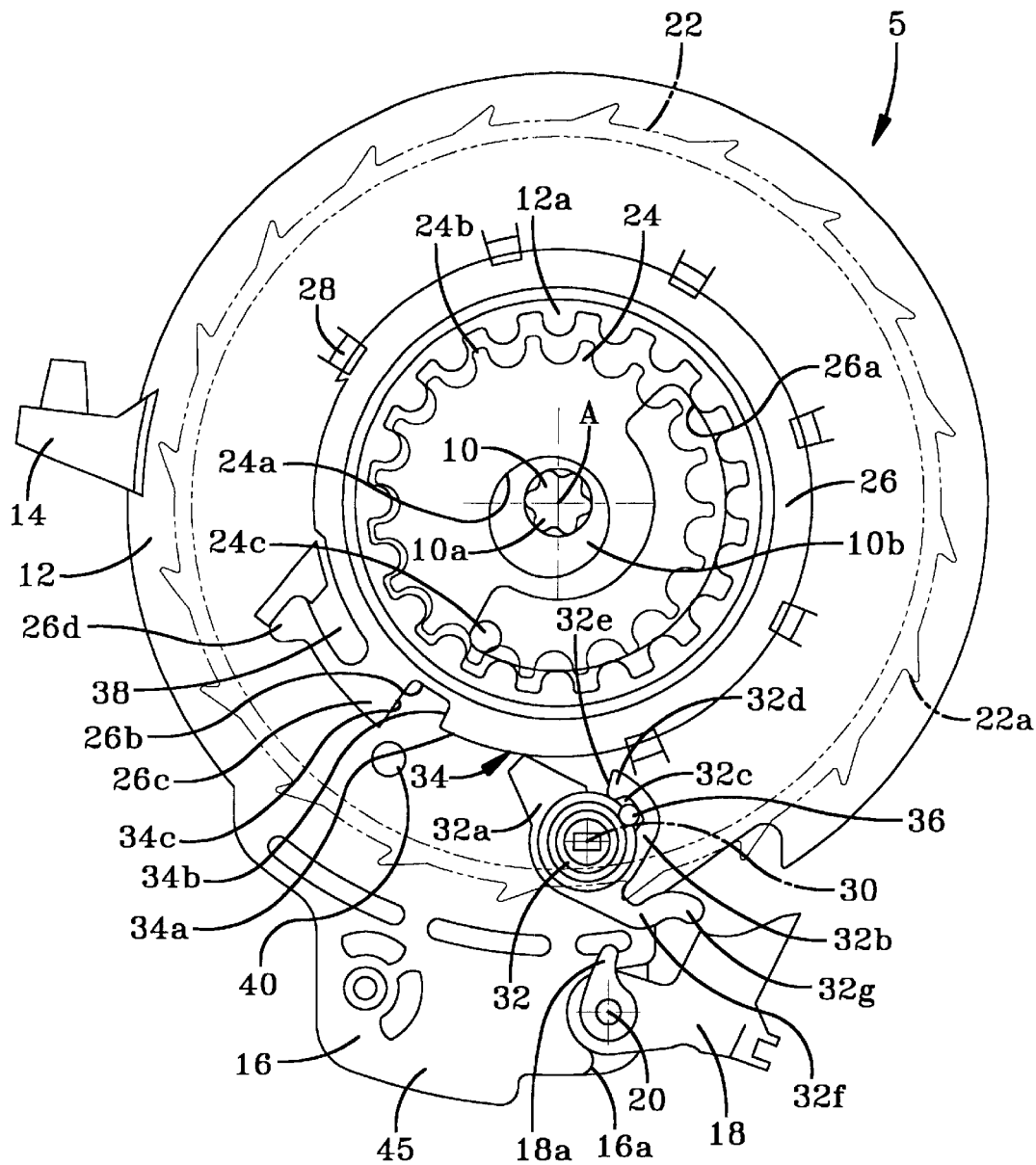
FIG. 1 is a schematic view of the front face of an automatic seatbelt retractor according to the invention in which the child seat locking device is shown in its' rest position.

Further advantageous developments and an embodiment will be described hereinafter with reference to the accompanying drawings. The terms "top", "bottom", "right" and "left" used in conjunction with the description of the embodiments refer to the orientation of the drawings as viewed with a normally legible description of the figures. It should also be noted that identical components are identified by identical reference numerals in the drawings.

Figure 2:
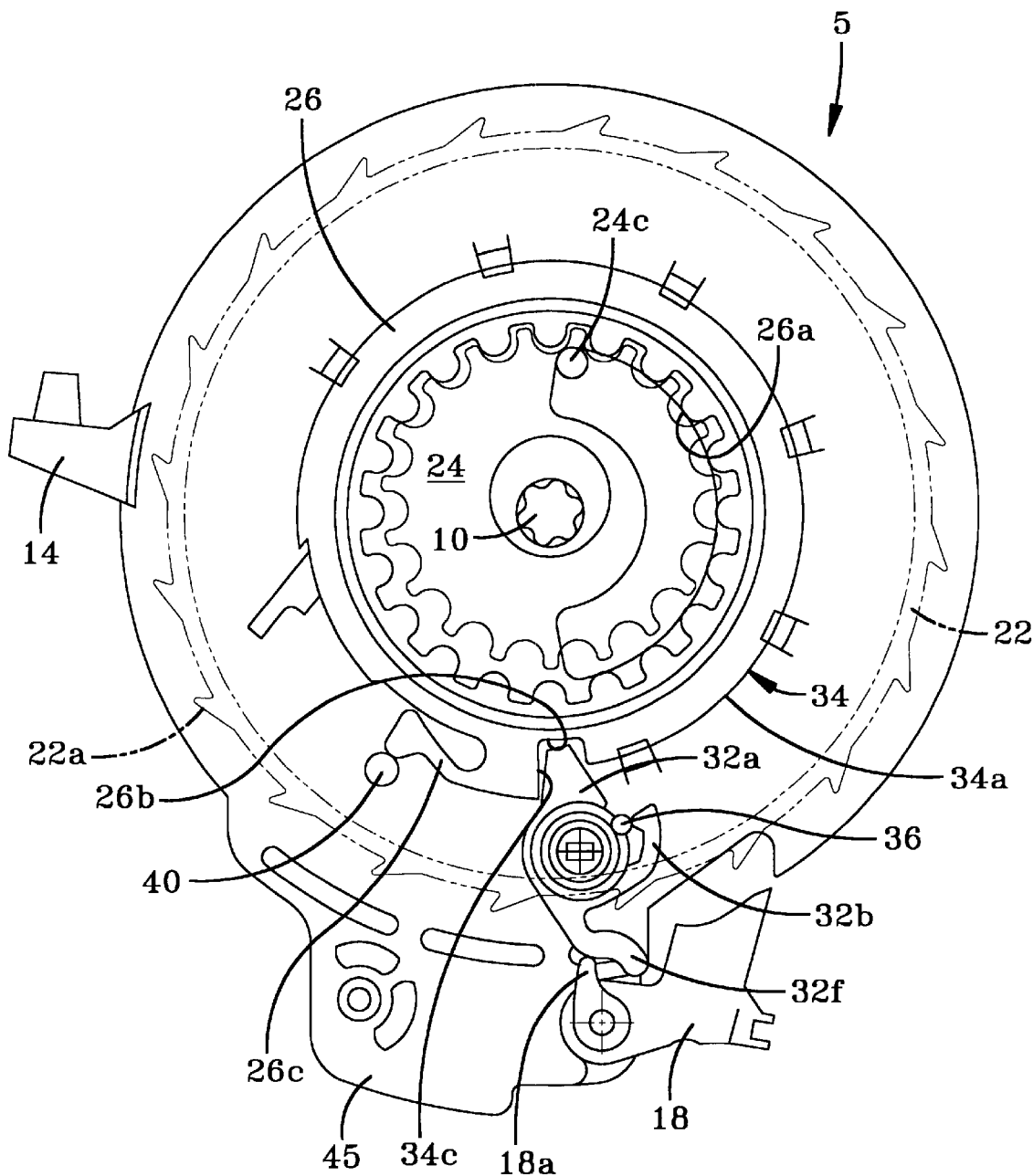
FIG. 2 is a view similar to FIG. 1 showing the child seat locking device in an intermediate position before attainment of the locking position.
Figure 3:
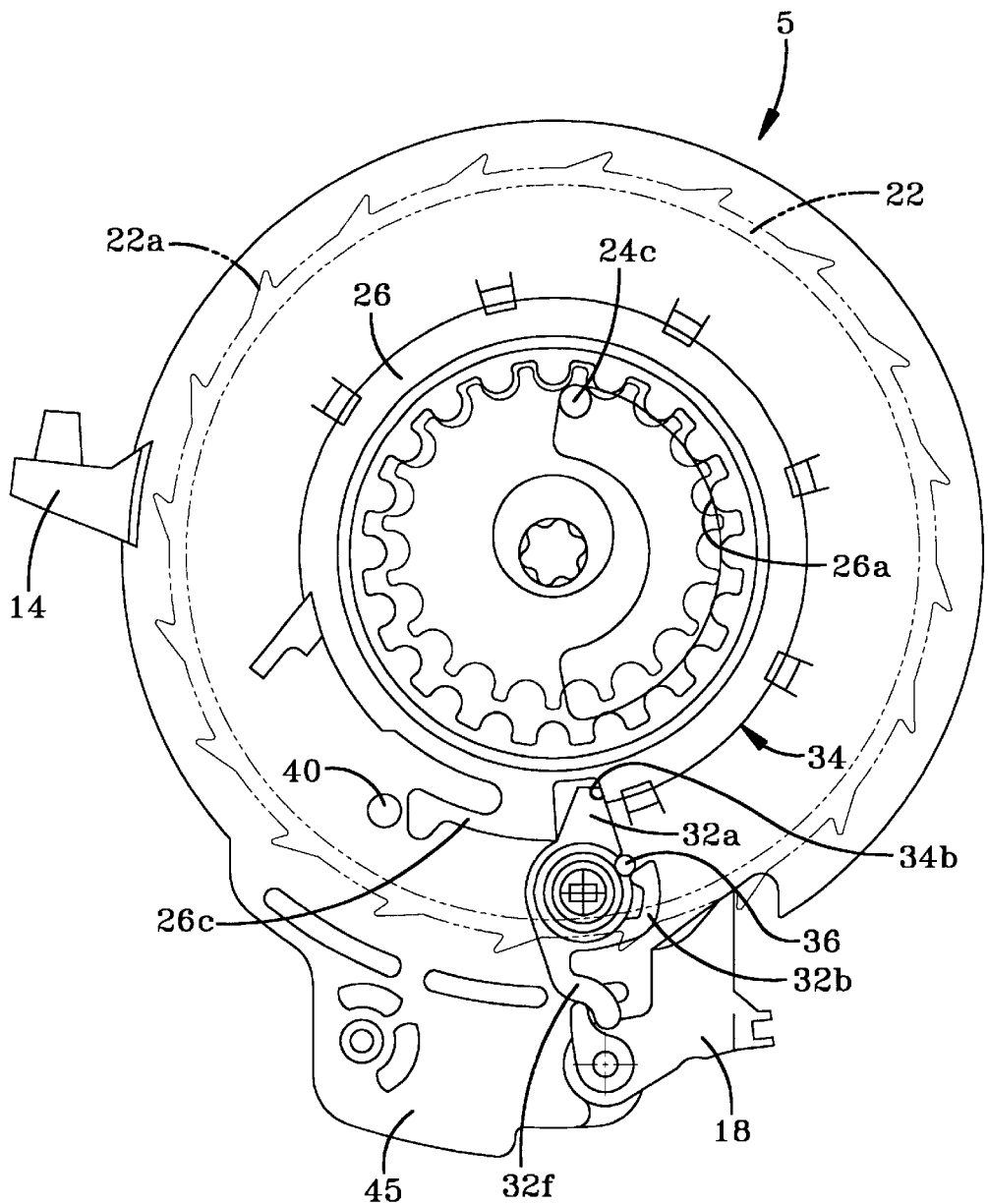
FIG. 3 is a view similar to FIG. 1 showing the child seat locking device in the locked position.

FIGS. 1 to 3 show an end face of an automatic seatbelt retractor 5 according to the invention with a child seat blocking or child seat locking device. The automatic seatbelt retractor comprises a winding shaft 10 that is made of metal. The winding shaft is mounted in a metal frame of the automatic seatbelt retractor (not shown in detail) that is rigidly connected to the vehicle chassis. Seatbelt webbing (also not shown) of the seatbelt system can be wound onto the winding shaft. In the embodiment shown in FIGS. 1 to 3, the winding shaft 10 extends substantially horizontally and perpendicularly to the plane of the drawings. For the rotational driving of various components of the seatbelt system, the winding shaft 10 is constructed as a serrated shaft.

The shaft end 10a, shown in FIGS. 1 to 3, of the winding shaft 10 passes through a carrier disc 12, produced from a plastic material, of a vehicle-sensitive pre-blocking device 45. The carrier disc 12 is arranged concentric with the winding shaft 10 freely rotatably thereon and is secured axially and radially by a plurality of resilient clips 14, made for example of a plastic material. The clips 14, one of which is shown in FIGS. 1 to 3, are arranged along the outer circumference of the carrier disc 12. The clips are shaped on a casing part made of a plastic material (which is not shown in detail) and is rigidly connected to the metal frame of the automatic seatbelt retractor.

The vehicle-sensitive pre-blocking device 45 comprises an inertia body, for example a ball (not shown in detail) which is mounted movably in a casing-like receiver 16 shaped on the lower outer circumference of the carrier disc 12. A pre-blocking pawl 18 is a securing component that engages the teeth of a gear wheel that is non-rotatably connected to the winding shaft. The inertia body acts on the pre-blocking pawl 18 which is produced from a plastic material and is mounted pivotal about a pivot axis 20 extending parallel to the winding shaft 10 on the receiver 16 of the carrier disc 12. The pre-blocking pawl 18 is pivoted radially inward by the inertia body during a displacement of the inertia body in the receiver 16 owing to a corresponding deceleration of the motor vehicle. The pre-blocking pawl comes into engagement with a pre-blocking gear wheel 22 that is made of a plastic material and is arranged non-rotatably on the winding shaft 10 behind the carrier disc 12 in the axial direction of the winding shaft 10. The teeth of the pre-blocking gear wheel 22 are designed in the manner of saw teeth, the saw teeth 22a pointing in the unwinding direction of the seatbelt webbing. The pivoting movement of the pre-blocking pawl 18 radially outward is limited by a stop 16a located on the receiver 16.

On the side facing the observer, the carrier disc 12 is provided with internal teeth 12a. The internal teeth 12a are arranged on a carrier ring (not shown in detail) which is formed integrally with the carrier disc 12 and has a diameter which is smaller than the external diameter of the carrier disc. The carrier ring for the internal teeth projects axially from the carrier disc.

A tumbling disc 24 made of a plastic material is also provided on the side of the carrier disc 12 facing the observer. The tumbling disc 24 is arranged on the winding shaft 10 eccentrically to the axis A of the winding shaft. For rotational driving by the winding shaft the tumbling disc 24 is provided with a bore-hole 24a of which the bore-hole axis (not shown in detail) extends parallel, but eccentrically to the axis of the winding shaft when assembled. With this bore-hole 24a, the tumbling disc 24 rests on a hub 10b which similarly has an external contour eccentric to the axis A of the winding shaft and is connected non-rotatably to the winding shaft. The tumbling disc 24 has a smaller diameter than the carrier disc 12. On its' exterior, the tumbling disc 24 has external teeth 24b which engage the internal teeth 12a of the carrier disc 12 and roll along the internal teeth 12a during rotation of the winding shaft 10. The external teeth 24b of the tumbling disc 24 and the internal teeth 12a of the carrier disc 12 together form a reduction gear which reduces the rotation of the winding shaft 10 toward the tumbling disc 24. The thickness of the tumbling disc 24 in the direction of the axis A of the winding shaft 10 roughly corresponds to the thickness of the carrier ring for the internal teeth 12a, so that the tumbling disc 24 is received in the carrier ring and ends flush with it.

Concentric with the axis A of the winding shaft 10 is an activating disc 26 made of a plastic material that is mounted to rotate freely on the winding shaft. The diameter of the winding shaft 10 is greater than that of the tumbling disc 24 but smaller than that of the carrier disc 12 and is also provided on the side of the tumbling disc 24 facing the observer. The activating disc 26 is secured in its' radial and axial position by a plurality of resilient clips 28 that are shaped integrally on the carrier disc 12 but do not prevent the rotational movement of the activating disc 26. The activating disc 26 has a circular depression (not shown in detail) which is directed toward the carrier disc 12 and has an internal diameter such that it overlaps the carrier ring for the internal teeth 12a. This depression has a depth roughly corresponding to the thickness of the carrier ring for the internal teeth 12a in the axial direction. Owing to the axial and radial fixing of the activating disc 26, the tumbling disc 24 is also secured axially and radially via the circular depression.

The activating disc 26 is also provided with an arcuate recess 26a extending concentric to the winding shaft 10 over an angle that is smaller than about 180°. As shown in FIGS. 1 to 3 the external radius of the recess 26a corresponds roughly to the internal radius of the internal teeth 12a of the carrier disc 12. A driving pin 24c formed integrally with the tumbling disc 24 engages in the recess 26a.

An intermediate element 32 made of a plastic material is also mounted rotatably on the side of the carrier disc 12 facing the observer by means of an shaft 30 mounted rigidly on the carrier disc 12. The shaft 30 is made of a plastic material and extends substantially parallel to the axis A of the winding shaft 10 and is arranged on the carrier disc 12 at the bottom in the region of the vehicle-sensitive pre-blocking device 45.

The intermediate element 32 possesses several functional portions that will be described hereinafter. Thus, the intermediate element 32 comprises a cam portion 32a, a catch lever portion 32b and an actuating lever portion 32f.

The cam portion 32a scans a control contour 34 that is provided on the outer circumference of the activating disc 26 and will be described in more detail hereinafter. The cam portion 32a rests on this control contour 34 during the entire actuation of the intermediate element 32 or of the activating disc 26 and has the form of a truncated cone projected into a plane.

The catch lever portion 32b arranged in a position about 90° in a clockwise direction relative to the cam portion 32a is designed as a radially resilient lever. The catch lever portion 32b is integrally connected at one end to the intermediate element 32 and initially extends radially outward and then, while maintaining a space 32c, in the circumferential direction of the intermediate element 32. At the free end, the catch lever portion 32c is provided with a radially inwardly extending triangular extension 32d in such a way that the space 32c is closed on all sides. The extension 32d preferably rests on the outer circumference of the intermediate element 32. On the projection 32d, the catch lever portion 32b is provided with a contact contour 32e that is directed in the circumferential direction of the intermediate element 32 and with which the catch lever portion 32 rests on a catch pin 36 in a locking position which will be described hereinafter. In the rest position of the intermediate element 32 shown in FIG. 1 the catch lever portion 32b comprises the catch pin 36 which is preferably produced from a plastic material and is rigidly mounted on the carrier disc 12 in an orientation substantially parallel to the winding shaft 10.

The actuating lever portion 32f of the intermediate element 32 is provided roughly at an angle of 180° opposite the cam portion 32a. The actuating lever portion 32f is connected integrally to the intermediate element 32 at one end and projects roughly radially outward from the intermediate element. At its' free end, the actuating lever portion 32f has an S-shaped contour with a rounded end 32g. With this end 32g, the actuating lever portion acts on the pre-blocking pawl 18 of the vehicle-sensitive pre-blocking device 45 or on a lever extension 18a connected to the pre-blocking pawl.

The control contour 34 that is provided on the outer circumference of the activating disc 26 and is scanned by the cam portion 32a of the intermediate element 32 has a plurality of control regions 34a–34c. The first control region 34a is formed by the unchanged outer contour of the activating disc 26 and can be described as a control region for the rest position of the intermediate element 32. The intermediate element is at rest while the cam portion 32a of the intermediate element scans this control region 34a. The control regions 34b, 34c, i.e. the second and third control regions adjoining the first control region 34a in the extraction direction of the seatbelt webbing are formed by the lateral edges of a substantially U-shaped recess 26b provided on the activating disc 26. During the scanning of these control regions 34b, 34c by the cam portion 32a of the intermediate element 32, the intermediate element is pivoted in a clockwise or anticlockwise direction in a manner which will be described hereinafter.

In the belt extraction direction, a resiliently designed catch lever 26c that directly adjoins the recess 26b is provided on the outer circumference of the activating disc 26. The lateral edge of the recess 26b forming the third control region 34c is identical to the outer edge of the catch lever 26c. The catch lever 26c is connected integrally at one end to the activating disc 26, extends radially outward from there and then, while maintaining a space 38 in the belt extraction direction, in the circumferential direction of the activating disc. At its' free end the catch lever 26c is provided with a radially outwardly extending triangular extension 26d. With the side of the triangle facing in the belt extraction direction of the extension 26d, the catch lever 26c rests on a catch pin 40, made of a plastic material, in a locking position which will be described in more detail hereinafter. The catch pin 40 is mounted on the side of the carrier disc 12 facing the observer in an orientation extending substantially parallel to the winding shaft 10. The catch lever 26c is designed in such a way that it can deflect radially.

As already described hereinbefore, FIG. 1 shows the rest position of the child seat locking or pre-blocking device. Starting from this position, the automatic seatbelt retractor according to the invention operates as follows.

If the seatbelt webbing is unwound from the winding shaft 10 in a clockwise direction, the pre-blocking gear wheel 22 also rotates in a clockwise direction. Owing to the eccentric arrangement of the tumbling disc 24 relative to the winding shaft 10 and owing to the engagement of the external teeth 24b of the tumbling disc 24 with the internal teeth 12a of the carrier disc 12, the tumbling disc 24 is simultaneously set into rotation in a counter clockwise direction.

After extraction of a first predetermined length of belt webbing, the driving pin 24c, which is non-rotatably connected to the tumbling disc 12 and which engages in the arcuate recess 26a of the activating disc 26, comes into contact with the face end of the recess 26a directed in a counter clockwise direction, as shown in FIG. 2.

Since the activating disc 26 is freely rotatable relative to the winding shaft 10, the activating disc is therefore engaged by the driving pin 24b during continued extraction of the seatbelt webbing. The activating disc 26 is therefore rotated in a counter clockwise direction. The cam portion 32a scans the control contour 34 at the outer circumference of the activating disc and, after a the extraction of a further predetermined length of the seatbelt webbing, comes into engagement with the recess 26b, as shown in FIG. 2. The cam portion 32a comes into contact with the third control region 34c of the control contour 34 (see FIG. 2) so that, during further extraction of the seatbelt webbing, the intermediate element 32 begins to pivot or rotate in a clockwise direction. Owing to this pivoting movement, the actuating lever portion 32f of the intermediate element 32 again comes into contact with the pre-blocking pawl 18 or the lever extension 18a of the vehicle-sensitive pre-blocking device 45. At the same time, the catch lever portion 32b of the intermediate element 32 begins to move past the catch pin 36 by pivoting radially outward. Furthermore, the catch lever 26c of the activating disc 26 begins to move past the catch pin 40 mounted rigidly on the carrier disc 12, while pivoting radially inward owing to contact with the catch pin as shown in FIG. 2.

During further extraction of the seatbelt webbing, the activating disc 26 is rotated further in a counter clockwise direction owing to the engagement of the driving pin 24b, so that the actuating lever portion 32f of the intermediate element 32 pivots the pre-blocking pawl 18 radially inward via the lever extension 18a of the vehicle-sensitive pre-blocking device 45, so that the pre-blocking device comes into engagement with the teeth 22a of the pre-blocking gear wheel 22 as shown in FIG. 3. At the same time, the catch lever portion 32b engages behind the catch pin 36 and the catch lever 26c behind the catch pin 40. The locking position of the child seat locking device is thus achieved. Further extraction of seatbelt webbing is prevented by the engagement of the blocking pawl 18 in the teeth 22a of the pre-blocking gear wheel 22, so that a forward movement of an object, for example a child seat, held by the seatbelt webbing, is avoided. However, the seatbelt webbing can be retracted again at any time as, in this case, the pre-blocking pawl 18 slips over the teeth 22a. Premature release of the locking position is prevented by the catch lever portion 32b and the catch lever 26c contacting the respective catch pin 36, 40.

For releasing the locking position, the seatbelt webbing is wound on the winding shaft 10 again by known measures. During this winding, the pawl 18 passes over the teeth 22a that are now rotating in a counter clockwise direction. After a predetermined length of seatbelt webbing, the driving pin 24b comes into contact with the face end, directed in a clockwise direction, of the recess 26a of the activating disc 26. The activating disc is therefore rotated in a clockwise direction, the catch lever 26c disengaging from the catch pin 40 and the catch lever portion 32b disengaging from the catch pin 36. The intermediate element 32 is pivoted in a counter clockwise direction by the second control region 34b of the control contour 34, so that the actuating lever portion 32f disengages from the pawl 18. The pawl pivots from the path of movement of the pre-blocking gear wheel 22 owing to gravity or a spring element (not shown in detail) so that the position shown in FIG. 1 is finally adopted again.

In summary the automatic seat belt retractor 5 of the present invention has at least one pre-locking device comprising the pre-blocking pawl 18, the pre-blocking gear wheel 22, the activating disc 26 and the intermediate element 32. That is to say the pre-locking device has an actuating device comprising the tumbling disc 24 and activating disc 26 which actuates at least one securing component in the form of the pre-blocking pawl 18 which is a component of the vehicle-sensitive pre-blocking device 45. An automatic seatbelt retractor should prevent catching in the otherwise slack seatbelt located inside a vehicle when getting in and out, or loading and unloading, etc. Of course the automatic seatbelt retractor 5 of the present invention contains those well known components that prevent a forward movement of a person secured by the seatbelt when the motor vehicle is subjected to rapid deceleration. Any suitable well known locking device module that prevents unwinding of the seatbelt in such cases may be used in the practice of the present invention to carry this out. To distinguish from further locking devices which may be provided this module is referred to herein and in the appended claims as the main locking means.

While certain representative embodiments and details have been presented for the purpose of illustrating the invention, it will be apparent to those skilled in the art that various changes and modifications may be made thereto without departing from the scope of the invention as defined in the following claims.

We claim:

1. An automatic seatbelt retractor comprising a winding shaft for winding and unwinding a seatbelt webbing and at least one pre-locking device for pre-locking the winding shaft against further rotation and for driving a main locking means for preventing a forward movement of a person secured by the seatbelt when the motor vehicle is subjected to rapid deceleration, the pre-locking device comprising an actuating device which actuates at least one securing component as a function of the extraction of a predetermined length of the seatbelt webbing from the winding shaft to hold the winding shaft in the pre-locking position, for actuation of the securing component by the actuating device a single intermediate element, which can be moved reversibly by the actuating device from a rest position into a locking position, is provided between the actuating device and the securing component, the securing component of the pre-locking device is a pawl associated with at least one vehicle-sensitive pre-blocking device, the vehicle-sensitive pre-blocking device comprising a carrier disc on which the intermediate element and the securing component are rotatably mounted, the actuating device and the intermediate element are lockable independently of one another in the locking position of the pre-locking device, and catch pins are provided on the carrier disc for securing the position of the actuating device and the intermediate element with respect to the carrier disc.

2. The automatic seatbelt retractor according to claim 1 wherein the pawl is pivotally mounted and can be pivoted by the intermediate element into the pre-locking position in which the pawl engages external teeth of a wheel non-rotatably connected to the winding shaft for maintaining the pre-locking position.

3. The automatic seatbelt retractor according to claim 1 wherein the vehicle-sensitive pre-blocking device comprises a carrier disc on which the intermediate element is mounted such that the intermediate element can rotate.

4. The automatic seatbelt retractor according to claim 1 wherein the vehicle-sensitive pre-blocking device comprises a carrier disc on which the intermediate element is pivotally mounted.

5. The automatic seatbelt retractor according to claim 1 wherein the intermediate element comprises a locking portion for releasably securing the intermediate element in a locking position.

6. The automatic seatbelt retractor according to claim 5 wherein the actuating device is a reduction gear rotatably connected to the winding shaft.

7. The automatic seatbelt retractor according to claim 6 wherein the actuating device contains a tumbling disc that is arranged eccentrically on the winding shaft, is rotatably connected thereto and, as a function of the extracted length of the seatbelt webbing, actuates an activating disc which is rotatably mounted on the winding shaft and which is in engagement with the intermediate element.

8. The automatic seatbelt retractor according to claim 7 wherein the tumbling disc has external teeth which roll on internal teeth which are stationary relative to the rotating tumbling disc, the internal teeth being arranged on a carrier ring which is formed integrally with the carrier disc.

9. The automatic seatbelt retractor according to claim 8 wherein the activating disc has an outer circumference with a control contour that scans a cam portion of the intermediate element.

10. The automatic seatbelt retractor according to claim 9 wherein an arcuate recess in the activating disc that engages a driving pin rigidly connected to the tumbling disc.

11. The automatic seatbelt retractor according to claim 10 wherein the arcuate recess has an arc length corresponding to the extracted length of the seatbelt webbing until the pre-locking device is released.

12. The automatic seatbelt retractor according to claim 11 wherein the activating disc is retained in the pre-locking position by a catch lever which is provided at the outer circumference of the activating disc and rests releasably on a catch pin which is stationary in the locking position of the catch lever.

13. The automatic seatbelt retractor according to claim 1 wherein the vehicle-sensitive pre-blocking device comprises a carrier disc on which the intermediate element and the securing component are pivotally mounted.

14. The automatic seatbelt retractor according to claim 13 wherein the actuating device and the intermediate element are lockable independently of one another in the locking position of the pre-locking device.

15. The automatic seatbelt retractor according to claim 14 wherein the intermediate element comprises at least one cam portion which is in engagement with the actuating device and one actuating portion which actuates the securing component releasing the pre-locking of the winding shaft.

16. The automatic seatbelt retractor according to claim 15 wherein the intermediate element comprises a locking portion for the releasable fixing of the intermediate element in its' locking position.

17. The automatic seatbelt retractor according to claim 16 wherein the actuating device is a reduction gear connected in a rotatable manner to the winding shaft.

18. The automatic seatbelt retractor according to claim 17 wherein the actuating device contains a tumbling disc that is arranged eccentrically on the winding shaft, is connected thereto in a rotatable manner and, as a function of the extracted length of the seatbelt webbing, actuates an activating disc which is mounted in a rotatable manner on the winding shaft and which is in engagement with the intermediate element.

19. The automatic seatbelt retractor according to claim 18 wherein the tumbling disc has external teeth which roll on internal teeth which are stationary relative to the rotating tumbling disc, the internal teeth being arranged on a carrier ring which is formed integrally with the carrier disc.

20. The automatic seatbelt retractor according to claim 19 wherein the activating disc has an outer circumference with a control contour that scans a cam portion of the intermediate element.

21. The automatic seatbelt retractor according to claim 20 wherein an arcuate recess in the activating disc that engages a driving pin rigidly connected to the tumbling disc.

22. The automatic seatbelt retractor according to claim 21 wherein the arcuate recess has an arc length corresponding to the extracted length of the seatbelt webbing until the pre-locking device is released.

23. The automatic seatbelt retractor according to claim 22 wherein the catching of the activating disc in the pre-locking position is formed by a catch lever which is provided at the outer circumference of the activating disc and rests on a catch pin which is stationary in the locking position of the catch lever.

* * * * *